(12) United States Patent
Frank et al.

(10) Patent No.: US 11,122,069 B2
(45) Date of Patent: *Sep. 14, 2021

(54) DETECTING COMPROMISED SOCIAL MEDIA ACCOUNTS BY ANALYZING AFFINITY GROUPS

(71) Applicant: INTERNATIONAL BUSINESS MACHINES CORPORATION, Armonk, NY (US)

(72) Inventors: Paul A. R. Frank, Hamburg (DE); Martin G. Keen, Cary, NC (US); Hernan A. Cunico, Holly Springs, NC (US); Adam Smye-Rumsby, Reading, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,468

(22) Filed: Nov. 26, 2019

(65) Prior Publication Data

US 2020/0099711 A1    Mar. 26, 2020

Related U.S. Application Data

(63) Continuation of application No. 15/819,520, filed on Nov. 21, 2017, now Pat. No. 10,542,023.

(51) Int. Cl.
*H04L 9/00* (2006.01)
*H04L 29/06* (2006.01)
(Continued)

(52) U.S. Cl.
CPC ...... *H04L 63/1425* (2013.01); *H04L 63/1441* (2013.01); *H04L 51/32* (2013.01); *H04L 67/26* (2013.01); *H04L 67/306* (2013.01)

(58) Field of Classification Search
CPC ................ H04L 63/1425; H04L 63/1441
(Continued)

(56) References Cited

U.S. PATENT DOCUMENTS

| 7,526,459 | B2 * | 4/2009 | Flinn | G06Q 30/0255 |
|---|---|---|---|---|
| | | | | 706/12 |
| 8,402,548 | B1 * | 3/2013 | Muriello | G06F 21/31 |
| | | | | 726/26 |

(Continued)

OTHER PUBLICATIONS

Hua et al., "Threshold and Associative Based Classification for Social Spam Profile Detection on Twitter", 2013 Ninth International Conference on Semantics, Knowledge and Grids, 2013, 8 pages.
(Continued)

*Primary Examiner* — Christopher J Brown
(74) *Attorney, Agent, or Firm* — Anthony England; Andrew D. Wright; Roberts Calderon Safran & Cole, P.C.

(57) ABSTRACT

Devices and methods for detecting a compromised social media account are disclosed. A method includes: receiving, by a computing device, social media content corresponding to a plurality of social media accounts; determining, by the computing device, a plurality of affinity groups, each including two or more social media accounts from the plurality of social media accounts, based upon the received social media content; determining, by the computing device, whether or not a particular social media account of the plurality of social media accounts is compromised using the received social media content and the determined plurality of affinity groups; and in response to determining that the particular social media account is compromised, the computing device providing a notification indicating that the particular social media account is compromised.

20 Claims, 7 Drawing Sheets

(51) Int. Cl.
   *H04L 29/08* (2006.01)
   *H04L 12/58* (2006.01)

(58) Field of Classification Search
   USPC .......................................................... 726/23
   See application file for complete search history.

(56) References Cited

U.S. PATENT DOCUMENTS

| | | | |
|---|---|---|---|
| 9,117,074 B2* | 8/2015 | Srivastava | G06F 21/552 |
| 9,124,617 B2* | 9/2015 | Palumbo | G06F 21/564 |
| 9,264,418 B1 | 2/2016 | Crosley | |
| 9,659,185 B2 | 5/2017 | Elovici et al. | |
| 10,200,487 B2* | 2/2019 | Arabo | H04L 29/08693 |
| 2012/0297477 A1 | 11/2012 | Raviv | |
| 2014/0150109 A1 | 5/2014 | Fire et al. | |
| 2016/0005050 A1 | 1/2016 | Teman | |
| 2017/0041408 A1* | 2/2017 | Kramer | H04L 63/102 |
| 2019/0158519 A1 | 5/2019 | Frank et al. | |

OTHER PUBLICATIONS

Egele et al., "Towards Detecting Compromised Accounts on Social Networks", http://www0.cs.ucl.ac.uk/staff/G.Stringhini/papers/compa-TDSC15.pdf, Accessed Nov. 17, 2017, 14 pages.

Mell et al., "The NIST Definition of Cloud Computing", NIST, Special Publication 800-145, Sep. 2011, 7 pages.

List of IBM Patents or Patent Applications Treated as Related, dated Nov. 25, 2019, 1 page.

\* cited by examiner

DETECTING COMPROMISED SOCIAL MEDIA ACCOUNTS BY ANALYZING AFFINITY GROUPS

BACKGROUND

The present invention generally relates to computing devices and, more particularly, to a system and method for detecting compromised social media accounts by analyzing affinity groups.

Hacking social media accounts, where an unauthorized user compromises (e.g., obtains control of) a social media account that is owned by another user, is increasingly common. Hacked social media accounts are often used to distribute malicious content. For example, hacked social media accounts may be used to publish malicious content (or links thereto) such as phishing websites (e.g., websites that falsely purport to be from reputable companies and that are designed to induce visitors to reveal personal information) or malware (e.g., virus-infected files). Hacked social media accounts may also be used to publish other types of malicious content designed to steal a user's personal or financial information, steal corporate secrets, damage a computing device, and/or damage a user's files on a computing device. Additionally, hacked social media accounts may be used to publish content (or links thereto) that is fraudulent (e.g., false advertising) or libelous.

Various approaches have been used to detect compromised social media accounts, including historical analysis and content analysis. In the historical analysis approach, new content posted by a social media account is correlated with content previously posted by that social media account. If there is not sufficient correlation between the new content and the previously posted content, the social media account may be identified as a potentially compromised account. In the content analysis approach, postings by a social media account are classified based upon a type or nature of the posted content. If the posted content is determined to meet predetermined criteria, the social media account may be identified as a potentially compromised account.

SUMMARY

In a first aspect of the invention, there is a method that includes: receiving, by a computing device, social media content corresponding to a plurality of social media accounts; determining, by the computing device, a plurality of affinity groups, each including two or more social media accounts from the plurality of social media accounts, based upon the received social media content; determining, by the computing device, whether or not a particular social media account of the plurality of social media accounts is compromised using the received social media content and the determined plurality of affinity groups; and in response to determining that the particular social media account is compromised, the computing device providing a notification indicating that the particular social media account is compromised.

In another aspect of the invention, there is a computer program product that includes a computer readable storage medium having program instructions embodied therewith. The program instructions are executable by a computing device to cause the computing device to: receive social media content corresponding to a plurality of social media accounts across a plurality of social media networks; determine a plurality of affinity groups based upon the received social media content; determine whether or not a particular social media account of the plurality of social media accounts is compromised using the received social media content and the determined plurality of affinity groups; and in response to determining that the particular social media account is compromised, provide a notification indicating that the particular social media account is compromised.

In another aspect of the invention, there is a system that includes: a hardware processor, a computer readable memory, and a computer readable storage medium associated with a computer device; program instructions of a social media content receiver configured to receive social media content corresponding to a plurality of social media accounts across a plurality of social media networks; program instructions of an affinity group determiner configured to determine a plurality of affinity groups, each including two or more social media accounts from the plurality of social media accounts, based upon the received social media content; and program instructions of a compromised account determiner configured to determine whether or not a particular social media account of the plurality of social media accounts is compromised using the received social media content and the determined plurality of affinity groups. The compromised account determiner, in response to determining that the particular social media account is compromised, is configured to provide a notification indicating that the particular social media account is compromised.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
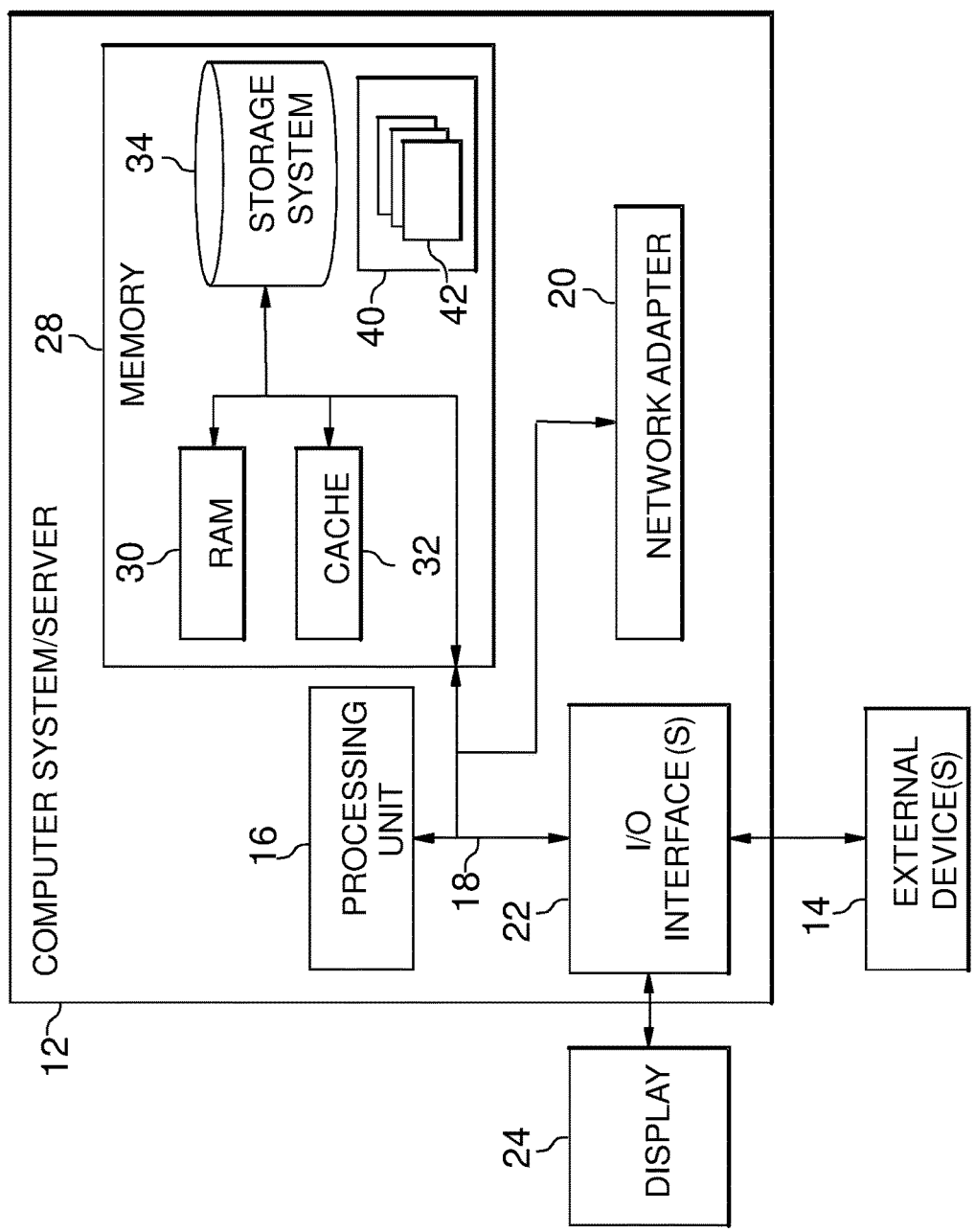
FIG. 1 depicts a cloud computing node in accordance with aspects of the invention.

Significant harm may result from the hacking of social media accounts. By using hacked social media accounts, individuals or organizations may be able to anonymously distribute malicious content and avoid identification by social media network operators and/or governmental entities. The publication of malicious content may cause damage to other social media users through information theft, damage to files, and/or damage to computing devices. Additionally, reputational damage may be inflicted on owners of hacked social media accounts. Early detection of hacked social media accounts may help a social media account owner, a social media network operator, and/or governmental entities to more effectively mitigate this harm.

The present invention generally relates to computing devices and, more particularly, to a system and method for detecting compromised social media accounts by analyzing affinity groups. Aspects of the invention are directed to detecting compromised social media accounts by analyzing affinity groups. Compromised social media accounts may be more accurately detected as compared to the historical analysis approach and the content analysis approach, thereby minimizing false positives (e.g., uncompromised social media accounts that are identified as potentially compromised) and false negatives (e.g., compromised social media account that are not identified as potentially compromised).

As described herein, aspects of the invention may include gathering information and content from social media accounts or users across multiple social media networks or platforms and analyzing the gathered information and content to identify multiple affinity groups or peer groups. Affinity groups or peer groups may include a plurality of social media accounts associated with a plurality of people that are linked together by shared elements or attributes. These shared elements may include demographic data (e.g., similar age, place of birth, date of birth, city, etc.), interests (e.g., an interest in a particular sports team, as determined based on "likes," subscriptions, and "follows"), and personality (e.g., as determined from posts).

Other aspects of the invention may include correlating new social media posts of an account or user with historical posts by the same account or user as well as historical posts from other accounts or users who are in one or more of the same affinity groups as the user and determining whether or not the social media account of the user is potentially compromised based on the correlation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
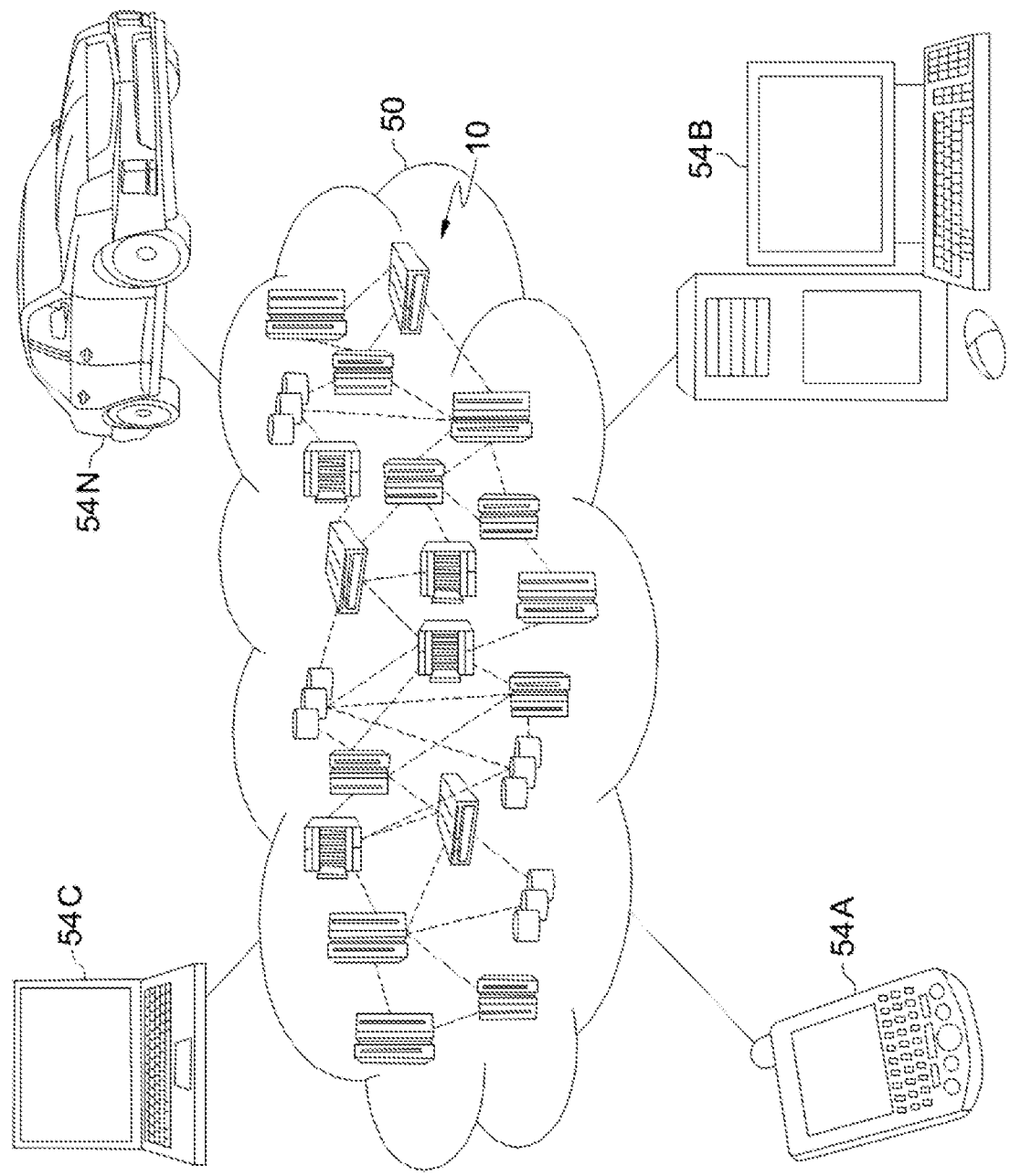
FIG. 2 depicts a cloud computing environment in accordance with aspects of the invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
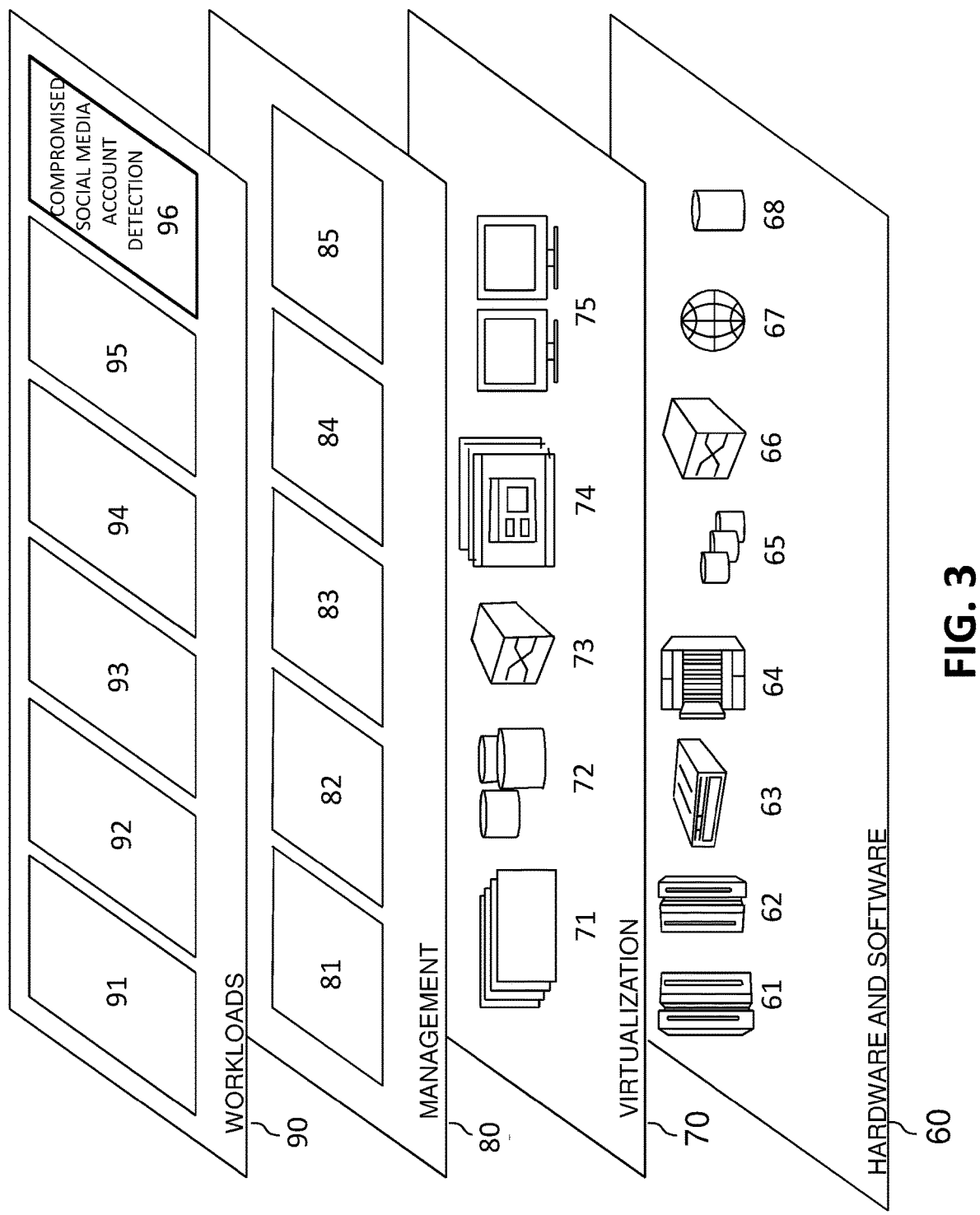
FIG. 3 depicts abstraction model layers in accordance with aspects of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compromised social media account detection 96.

Referring back to FIG. 1, the program/utility 40 may include one or more program modules 42 that generally carry out the functions and/or methodologies of embodiments of the invention as described herein (e.g., such as the functionality provided by compromised social media account detection 96). Specifically, the program modules 42 may gather information and content from social media accounts or users across multiple social media networks or platforms, analyze the gathered information and content to identify multiple affinity or peer groups, correlate new social media posts of an account or user with historical posts by the same account or user as well as historical posts from other accounts or users who are in one or more of the same peer groups as the account or user, and determine whether or not the social media account of the user is potentially compromised based on the correlation. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a compromised account detection program module 420 as shown in FIGS. 4 and 5.

Figure 4:
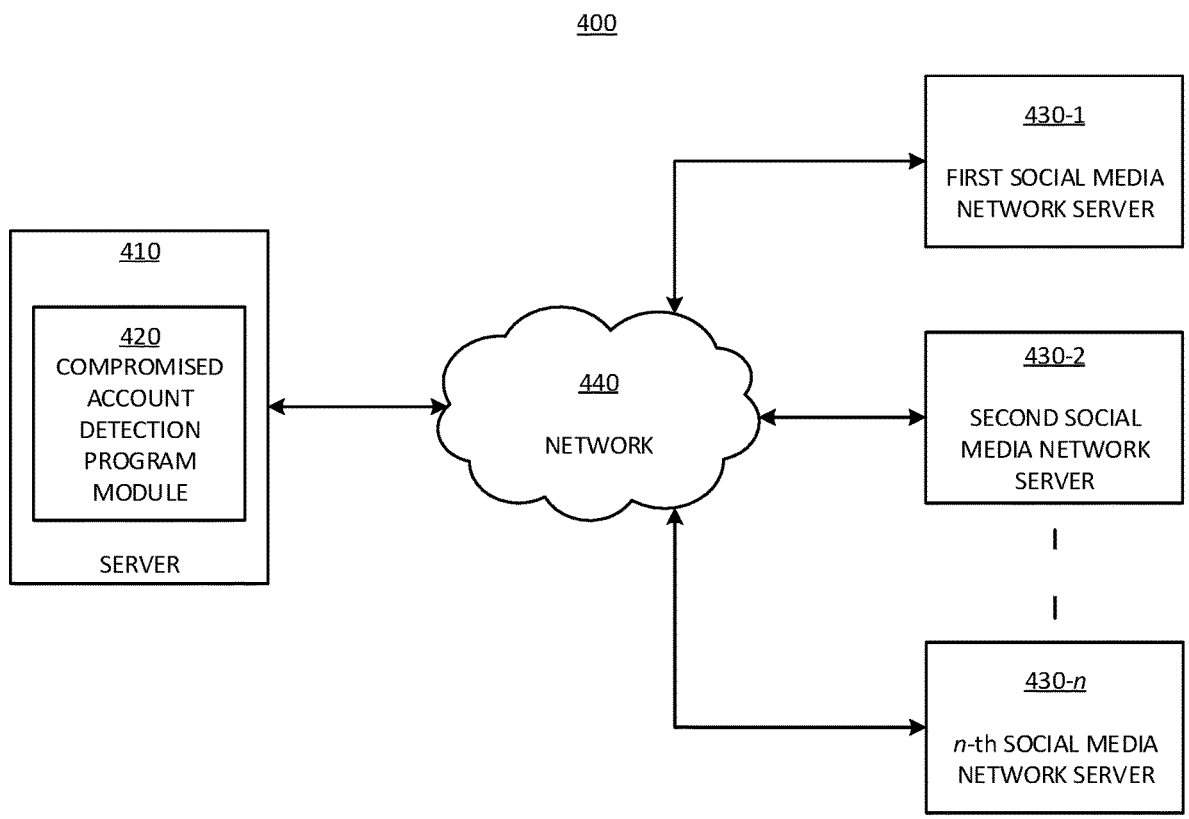
FIG. 4 depicts an illustrative environment in accordance with aspects of the invention.
Figure 5:
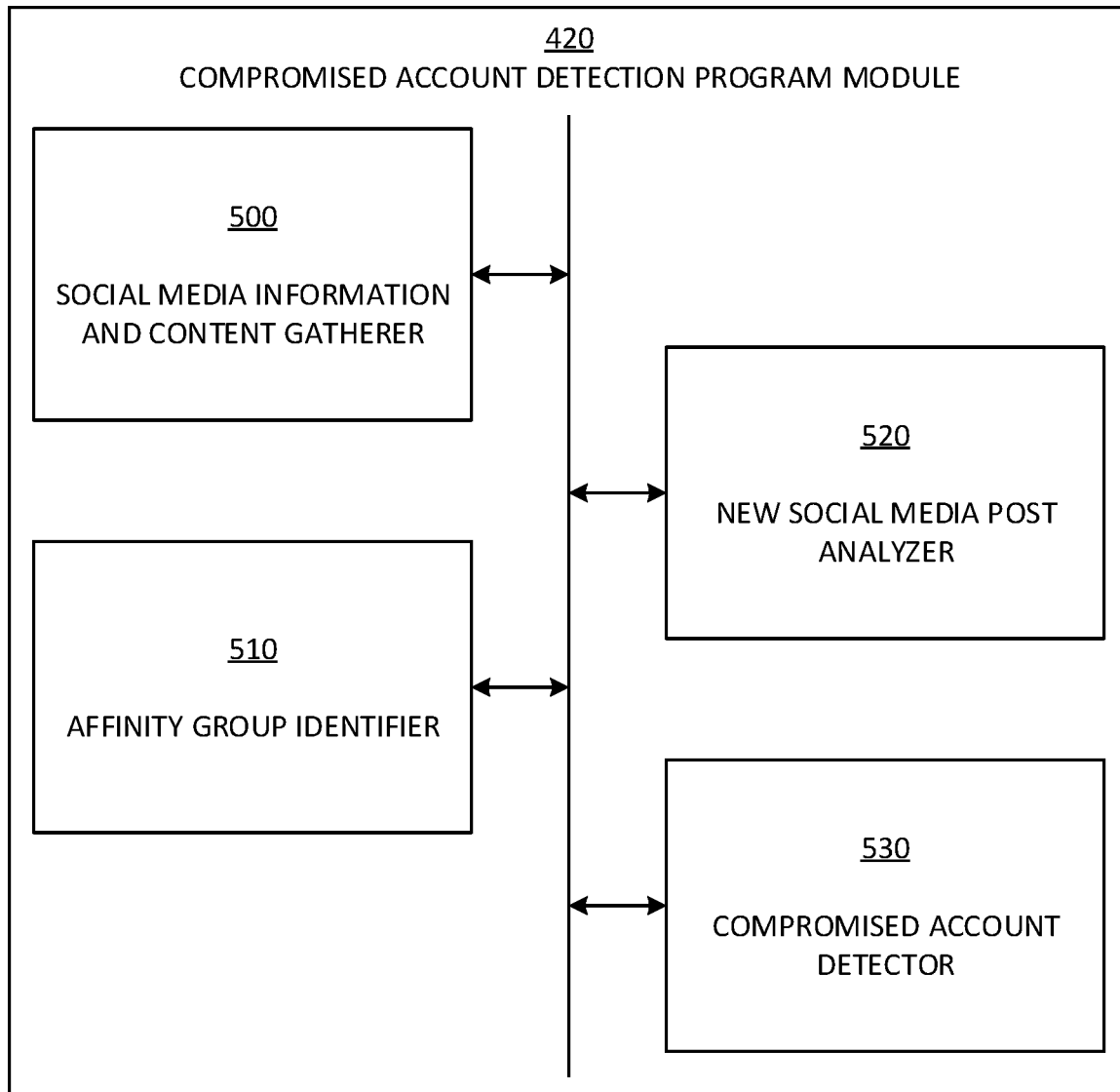
FIG. 5 depicts a block diagram of an exemplary program module in accordance with aspects of the invention.

FIG. 4 depicts an illustrative environment 400 in accordance with aspects of the invention. As shown, environment 400 comprises a server 410 which communicates via a computer network 440 with a first social media network server 430-1, a second social media network server 430-2, and an n-th social media network server 430-n. The network 440 may be any suitable network such as a LAN, WAN, or the Internet. The server 410, the first social media network server 430-1, the second social media network server 430-2, and the n-th social media network server 430-n may be physically collocated, or may be situated in separate physical locations.

The server 410 may be a server 12 shown in FIG. 1 and may be situated in the cloud computing environment 50 at one or more of the nodes 10 shown in FIG. 2. The server 410 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

The first social media network server 430-1, the second social media network server 430-2, and the n-th social media network server 430-n may also be situated in the cloud computing environment 50 on one or more of the nodes 10 shown in FIG. 2. The first social media network server 430-1, the second social media network server 430-2, and the n-th social media network server 430-n may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

According to an embodiment, the server 410 may include a compromised account detection program module 420, which may include hardware and/or software and may be one or more of the program modules 42 shown in FIG. 1. According to an embodiment, the compromised account detection program module 420 includes program instructions for executing a compromised account detection program. The program instructions included in the compromised account detection program module 420 of the server 410 may be executed by one or more hardware processors. According to an embodiment, the compromised account detection program performs functions related to detecting compromised social media accounts, as discussed below. The compromised account detection program may also perform other functions, for example, taking actions in response to detecting compromised social media accounts (e.g., disabling, locking, or otherwise blocking use of the compromised social media accounts).

According to embodiment, the compromised account detection program of the compromised account detection program module 420 may function to: (1) gather information and content from social media accounts or users across multiple social media networks or platforms including from the first social media network server 430-1, the second social media network server 430-2, and the n-th social media network server 430-n; (2) analyze the gathered information and content to identify multiple affinity or peer groups; (3) correlate new social media posts of an account or user with historical posts by the same account or user as well as historical posts from other accounts or users who are in one or more of the same peer groups as the user; and (4) determine whether or not the social media account of the user is potentially compromised based on the correlation.

FIG. 5 shows a block diagram of an exemplary compromised account detection program module 420 in the server 410 (of FIG. 4) in accordance with aspects of the invention. In embodiments, the compromised account detection program module 420 includes a social media information and content gatherer 500, an affinity group identifier 510, a new social media post analyzer 520, and a compromised account detector 530.

In embodiments, the social media information and content gatherer 500 gathers social media information and content related to a plurality of social media accounts. For a particular social media account, the social media information gathered may include, but is not limited to, Internet Protocol (IP) addresses, geolocation data, account creation date and time, numbers and/or identities of social media "friends" or "followers," and types of information posted. Additionally, for a particular social media account, the social media content gathered by include, but is not limited to, content posted by the social media account, content published at external websites that are linked to by the social media account, and/or profile content associated with the social media account.

According to an embodiment, the social media information and content gatherer 500 requests the social media information and content related to the plurality of social media accounts from one or more social media networks. For example, the social media information and content gatherer 500 may send one or more requests to the first social media network server 430-1, the second social media network server 430-2, and the n-th social media network server 430-*n* for the social media information and content related to the plurality of social media accounts. The social media information and content gatherer 500 may use Simple Object Access Protocol (SOAP) to request and obtain the social media information and content related to the plurality of social media accounts from web services running on the first social media network server 430-1, the second social media network server 430-2, and the n-th social media network server 430-*n*.

Alternatively, according to an embodiment, the social media information and content gatherer 500 may use one or more Application Programming Interfaces (APIs) of the one or more social media networks to request and obtain the social media information and content related to the plurality of social media accounts. According to another embodiment, the social media information and content gatherer 500 may use any other API or protocol to request and obtain the social media information and content related to the plurality of social media accounts.

The social media information and content gatherer 500 may request and obtain historical content, including social media information and content related to the plurality of social media accounts from one or more social media networks that was posted during a predetermined historical time period. This historical content requested and obtained by the social media information and content gatherer 500 may be used by the affinity group identifier 510 to identify affinity groups as described herein.

Additionally, the social media information and content gatherer 500 may request and obtain newly posted content including social media information and content related to the plurality of social media accounts from one or more social media networks. For example, the newly posted content requested and obtained by the social media information and content gatherer 500 may be social media information and content that was posted after a date and time when social media information and content was last requested and obtained by the social media information and content gatherer 500. This newly posted content requested and obtained by the social media information and content gatherer 500 may be analyzed by the new social media post analyzer 520 as described herein.

In embodiments, the affinity group identifier 510 determines one or more affinity groups for each of the plurality of social media accounts. According to an embodiment, the affinity group identifier 510 analyzes the social media information and content gathered by the social media information and content gatherer 500 to determine a set of affinity or peer groups. For example, the affinity group identifier 510 may determine a set of affinity groups based on age, interest in sports, employment, number of friends, identities of friends, identities of family members, "liked" pages, subscribed pages, or any other dimensions in the social media information and content related to the plurality of social media accounts.

According to an embodiment, the affinity group identifier 510 may be configured to identify affinity groups based upon one or more predetermined dimensions (e.g., age) in the data requested and obtained by the social media information and content gatherer 500. The affinity group identifier 510 may use natural language processing (NLP) techniques to analyze the social media information and content gathered by the social media information and content gatherer 500 to determine, for each of the plurality of social media accounts, data associated with the one or more predetermined dimensions. For example, the affinity group identifier 510 may use natural language processing techniques to identify profile data indicating an age and/or content indicating an age (e.g., a message wishing the user a happy $50^{th}$ birthday).

The affinity group identifier 510 may then assign each of the plurality of social media accounts to one or more affinity groups based on the determined data associated with the one or more predetermined dimensions. According to an embodiment, the affinity groups associated with one or more dimensions may be predetermined. For example, for the age dimension, there may be a predetermined set of age-based affinity groups corresponding to predetermined age ranges. For each of the plurality of social media accounts, the affinity group identifier 510 may use the determined data associated with the dimension to assign the social media account to one or more affinity groups in the dimension. For example, the affinity group identifier 510 may use profile information indicating an age of 25 to assign the social media account to an "age 21-25" affinity group.

According to an embodiment, the affinity group identifier 510 scores or ranks each social media account with respect to one or more dimensions based upon the determined data. The affinity group identifier 510 may rank the social media accounts based upon identified data associated with dimensions including a number of posts containing content related to a particular subject, a number of posts related to the particular subject liked on a social media network, and a count of social media network groups related to the particular subject of which the social media account is a member.

For example, the affinity group identifier 510 may determine social media accounts that are members of an online role-playing game affinity group. Members of this affinity group may have a high affinity towards online role-playing games. For each of a plurality of social media accounts, the affinity group identifier 510 may identify data associated with various dimensions (e.g., shared posts containing content related to online role-playing games, online role-playing games liked on a social media network, and social media network groups related to online role-playing games of which the social media account is a member). The affinity group identifier 510 may rank each social media account with respect to each of the various dimensions based upon the identified data. For example, the social media accounts may be ranked with respect to each of the various dimensions based upon identified data including a number of shared posts containing content related to online role-playing games, a number of online role-playing games liked on a social media network, and a count of social media network groups related to online role-playing games of which the social media account is a member.

According to an embodiment, the affinity group identifier 510 is configured (e.g., programmed) to determine a point in n-dimensional space occupied by each social media account based upon a score or rank assigned to the social media account by the affinity group identifier 510 for each of the n dimensions. The affinity group identifier 510 may analyze a distribution of the plurality of social media accounts in n-dimensional space to determine regions in the n-dimensional space occupied by a high density of social media accounts. The affinity group identifier 510 may determine that all of the social media accounts occupying a particular region in the n-dimensional space are members of a particular affinity group. According to an embodiment, the affinity group identifier 510 determines a centroid of a particular region occupied by a high density of social media accounts and determines that all social media account that are within a predetermined distance of the centroid are members of a particular affinity group. The affinity group identifier 510 may determine the distance between a social media account's position in n-dimensional space and the position of the centroid in the n-dimensional space using a Euclidean distance or using any other metric.

According to an embodiment, the affinity group identifier 510 is configured (e.g., programmed) to determine a closeness value for a particular social media account with respect to a particular affinity group of which the particular social media account is a member, based on the Euclidian distance (or the distance determined using any other metric) between the particular social media account's position in the n-dimensional space and the position in the n-dimensional space of the centroid of the affinity group. The closeness value may be in the range 0.0 to 1.0. For each social media account, the affinity group identifier 510 may store a plurality of affinity groups of which the social media account is a member, as determined by the affinity group identifier 510, as well as a closeness value determined by the affinity group identifier 510 for each affinity group of which the social media account is a member. The affinity group identifier 510 may store this information in a central user profile database system as tags and associated metadata (e.g., a date of a last profile update).

For example, a first social media account having a comparatively higher number of shared posts containing content related to online role-playing games, online role-playing games liked on a social media network, and social media network groups related to online role-playing games of which the social media account is a member and a second social media account having a comparatively lower number of the aforementioned posts, likes, and memberships may both be determined to be members of an online role-playing game affinity group. However, the first social media account may have a closeness value indicating that the first social media account is comparatively closer to the centroid of the online role-playing game affinity group as compared to that of the second social media account.

According to an embodiment, if there is no data determined to be associated with particular dimensions for a particular social media account, or if a level of confidence in the determined data is below a predetermined threshold (e.g., the data cannot be determined to correspond to a particular dimension), the affinity group identifier 510 may not assign the particular social media account to any affinity group associated with the particular dimensions. Additionally, if the distance between the point in n-dimensional space occupied by the social media account and the centroids of affinity groups associated with the particular dimensions exceeds a predetermined distance, the affinity group identifier 510 may not assign the particular social media account to any affinity group associated with the particular dimensions.

Alternatively, if the identified data associated with the particular dimensions for a particular social media account corresponds to two or more affinity groups associated with the particular dimensions, the affinity group identifier 510 may assign the particular social media account to two or more affinity groups associated with the particular dimensions if the distance between the point in n-dimensional space occupied by the social media account and the centroids of the two or more affinity groups does not exceed a predetermined distance. According to another embodiment, the affinity group identifier 510 may assign the particular social media account to the affinity group associated with the particular dimensions to which the distance between the point in n-dimensional space occupied by the social media account and the centroid of the affinity group is smallest.

According to another embodiment, a k-means technique may be used to partition the plurality of social media accounts into a plurality of affinity groups for each of one or more dimensions. For example, the k-means technique may be used to assign each of the plurality of social media accounts to one or more of a predetermined number of affinity groups associated with one or more dimensions based upon the identified data associated with the dimension and Euclidian distances or other distances calculated between points in n-dimensional space occupied by each social media account based upon a score or rank assigned to the social media account by the affinity group identifier 510 for each of the n dimensions. According to still another embodiment, instead of using a predetermined number of affinity groups for a dimension, the affinity group identifier 510 may dynamically determine a set of affinity groups for a dimension based upon clusters of social media accounts in n-dimensional space determined using the k-means technique. According to yet another embodiment, a silhouette measure may be used to determine the plurality of affinity groups for each of one or more dimensions.

The social media information and content gatherer 500 may gather updated social media information and content at predetermined time intervals, and the affinity group identifier 510 may use the updated social media information and content to update membership of the plurality of social media accounts in the plurality of affinity groups. For example, the social media information and content gatherer 500 may gather updated social media information and content in real time on a nightly or weekly basis, and the affinity group identifier 510 may use the updated social media information and content to determine or update affinity group membership as described herein for each of the plurality of social media accounts in real time or on a nightly or weekly basis. Additionally, the affinity group identifier 510 may recalculate the closeness values based on the updated social media information and content gathered by the social media information and content gatherer 500.

Alternatively, the social media information and content gatherer 500 may gather updated social media information and content at intervals based upon the amount of posted content, a number of newly created social media accounts, or any other factor. In another embodiment, the social media information and content gatherer 500 may gather updated social media information and content in response to a manual request. Social media accounts created between a current update and a previous update may also be classified by the affinity group identifier 510 as discussed above.

Still referring to FIG. 5, in embodiments, the new social media post analyzer 520 analyzes new social media posts. According to an embodiment, the new social media post analyzer 520 analyzes the newly posted social media information and content (e.g., new posts) gathered by the social media information and content gatherer 500. The new social media post analyzer 520 scores each new post based on a correlation with other posts (e.g., earlier posts) made by the same social media account as well as posts made by other social media accounts that are members of one or more of the same affinity groups as the social media account. The score may represent a likelihood of the post having been made by an owner of the social media account.

According to an embodiment, the new social media post analyzer 520 analyzes a new social media post by comparing content in the new social media post with content in other posts (e.g., earlier posts) made by the same social media account as well as content in posts made by other social media accounts that are members of one or more of the same affinity groups as the social media account. The new social media post analyzer 520 may determine individual content entities including links, pictures, and text in the new social media post. For each individual content entity, the new social media post analyzer 520 compares the content entity to content in posts made by other members of the affinity groups of which the social media account is a member.

The new social media post analyzer 520 may determine a sub-score for each content entity in the new social media post based upon a number of exact or near matches with content in posts made by other members of the affinity groups of which the social media account is a member. A comparatively higher sub-score may be assigned to a content entity in the new social media post that matches a comparatively larger number of items of content in posts made by other members of the affinity groups of which the social media account is a member, and a comparatively lower sub-score may be assigned to a content entity in the new social media post that matches a comparatively smaller number of items of content in posts made by other members of the affinity groups of which the social media account is a member. A comparatively higher score may indicate that a content entity is more in context with content posted by other members of the affinity groups of which the social media account is a member and therefore more likely to be posted by an owner of the social media account, and a comparatively lower score may indicate a content entity is less in context with content posted by other members of the affinity groups of which the social media account is a member and therefore more likely to be posted by someone other than an owner of the social media account (e.g., posted by a compromised account). According to another embodiment, in determining the sub-score for each content entity in the new social media post, the new social media post analyzer 520 may also compare the content entities to the content of news sites, blogs, and other websites associated with (e.g., linked to by) members of the affinity groups of which the social media account is a member.

The new social media post analyzer 520 may determine an overall score for the new social media post based on one or more sub-scores for one or more content entities in the new social media post. The new social media post analyzer 520 may determine the overall score as an average of the sub-scores for the one or more content entities in the new social media post. Alternatively, the new social media post analyzer 520 may determine the overall score based on a lowest sub-score or a highest sub-score among the sub-scores for the one or more content entities in the new social media post. According to an embodiment, a comparatively higher overall score determined by the new social media post analyzer 520 may represent a comparatively higher likelihood that the post was made by an owner of the social media account, and a comparatively lower overall score determined by the new social media post analyzer 520 may represent a comparatively lower likelihood that the post was made by an owner of the social media account.

According to an alternative embodiment, the new social media post analyzer 520 may, for a new social media post, determine a separate score for each affinity group of which the social media account is a member. In this embodiment, the new social media post analyzer 520 may determine an overall score for the new social media post using a weighted average of the scores for each affinity group, where the weighting is based upon the social media account's closeness value for the affinity group. In this manner, the new social media post analyzer 520 accords more weight to scores for affinity groups having centroids to which the social media account is closer.

Still referring to FIG. 5, in embodiments, the compromised account detector 530 determines whether or not a social media account is likely to be a compromised account based on an overall score for one or more new social media posts determined by the new social media post analyzer 520. The compromised account detector 530 may determine that a social media account is likely to be a compromised account if the overall score for a new social media post determined by the new social media post analyzer 520 is lower than a predetermined threshold.

According to another embodiment, the compromised account detector 530 may determine that a social media account is likely to be a compromised account if the overall score for each of a predetermined number of new social media posts is lower than a predetermined threshold. According to yet another embodiment, the compromised account detector 530 may determine that a social media account is likely to be a compromised account if the overall score for any one new social media post determined by the new social media post analyzer 520 is lower than a first predetermined threshold or if the overall score for each of a predetermined number of new social media posts is lower than a second predetermined threshold that is higher than the first predetermined threshold. The predetermined thresholds may be adjusted to reduce a number of social media accounts incorrectly determined to be likely to be compromised or to reduce a number of compromised social media accounts that are not determined to be likely to be compromised.

In response to determining that a social media account is likely to be compromised, the compromised account detector 530 may trigger a notification to be made to an account owner of the social media account, a social media network operator, or to the social media network or platform associated with the account. For example, a push notification may be sent to a mobile device of an account owner of the social media account. In response to determining that a social media account is likely to be compromised, the compromised account detector 530 may take other actions, including preventing additional posts from being made by the social media account, deleting or hiding posts made by the social media account after the account is determined to be likely to be compromised, restricting access to the social media account, or locking the social media account.

According to an embodiment, the compromised account detector 530 may receive feedback regarding whether or not the social media account that was determined to be likely to be compromised was actually compromised. The predetermined thresholds used by the compromised account detector 530 may be adjusted based on the feedback received to reduce a number of social media accounts incorrectly determined to be likely to be compromised or a number of compromised social media accounts that are not determined to be likely to be compromised.

Figure 6:
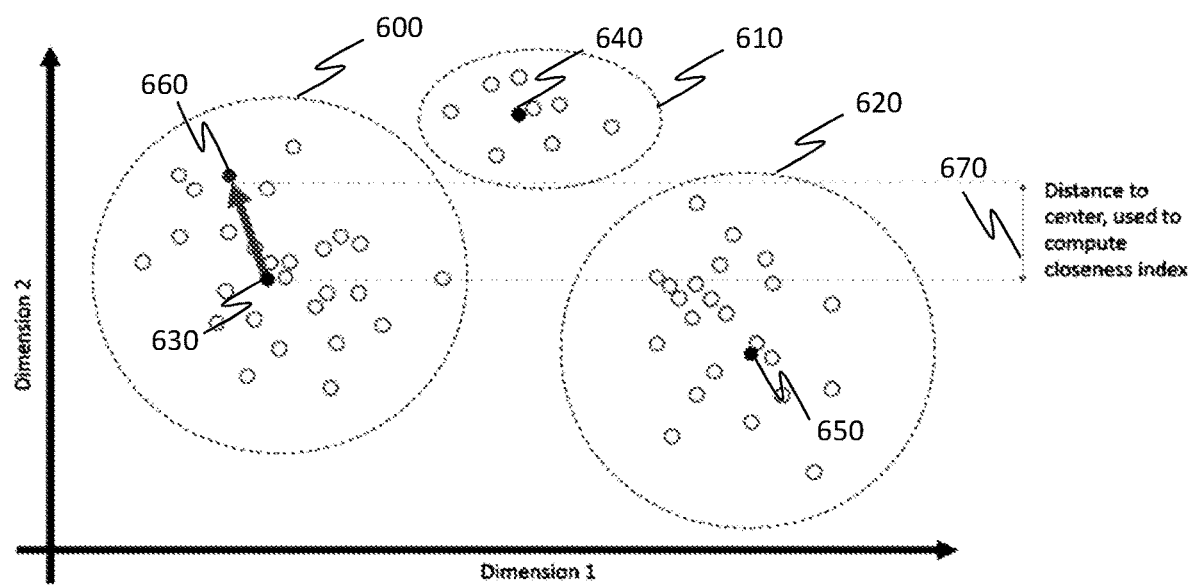
FIG. 6 depicts a plurality of points in n-dimensional space occupied by a plurality of social media accounts according to an example.

FIG. 6 depicts a plurality of points in n-dimensional space occupied by a plurality of social media accounts according to an example, as determined by the affinity group identifier 510, discussed above. The horizontal axis in FIG. 6 represents a first dimension, and the vertical axis represents a second dimension. As illustrated in FIG. 6, the social media accounts may be clustered in several high-density regions. The affinity group identifier 510 may determine centroids 630, 640, and 650 of regions occupied by a high density of social media accounts and may determine that all social media accounts that are within a predetermined distance of the centroid are members of a particular affinity group. For example, the affinity group identifier may determine that social media accounts within a predetermined distance 600 of the centroid 630 are members of a first affinity group, social media accounts within a predetermined distance 610 of the centroid 640 are members of a second affinity group, and social media accounts within a predetermined distance 620 of the centroid 650 are members of a third affinity group.

The affinity group identifier 510 may determine the distance between a social media account's position in n-dimensional space 660 and a position of the closest centroid among centroids 630, 640, and 650 using a Euclidean distance or using any other metric. The affinity group identifier 510 may determine a closeness value for a particular social media account 660 using the determined distance, as discussed herein.

Figure 7:
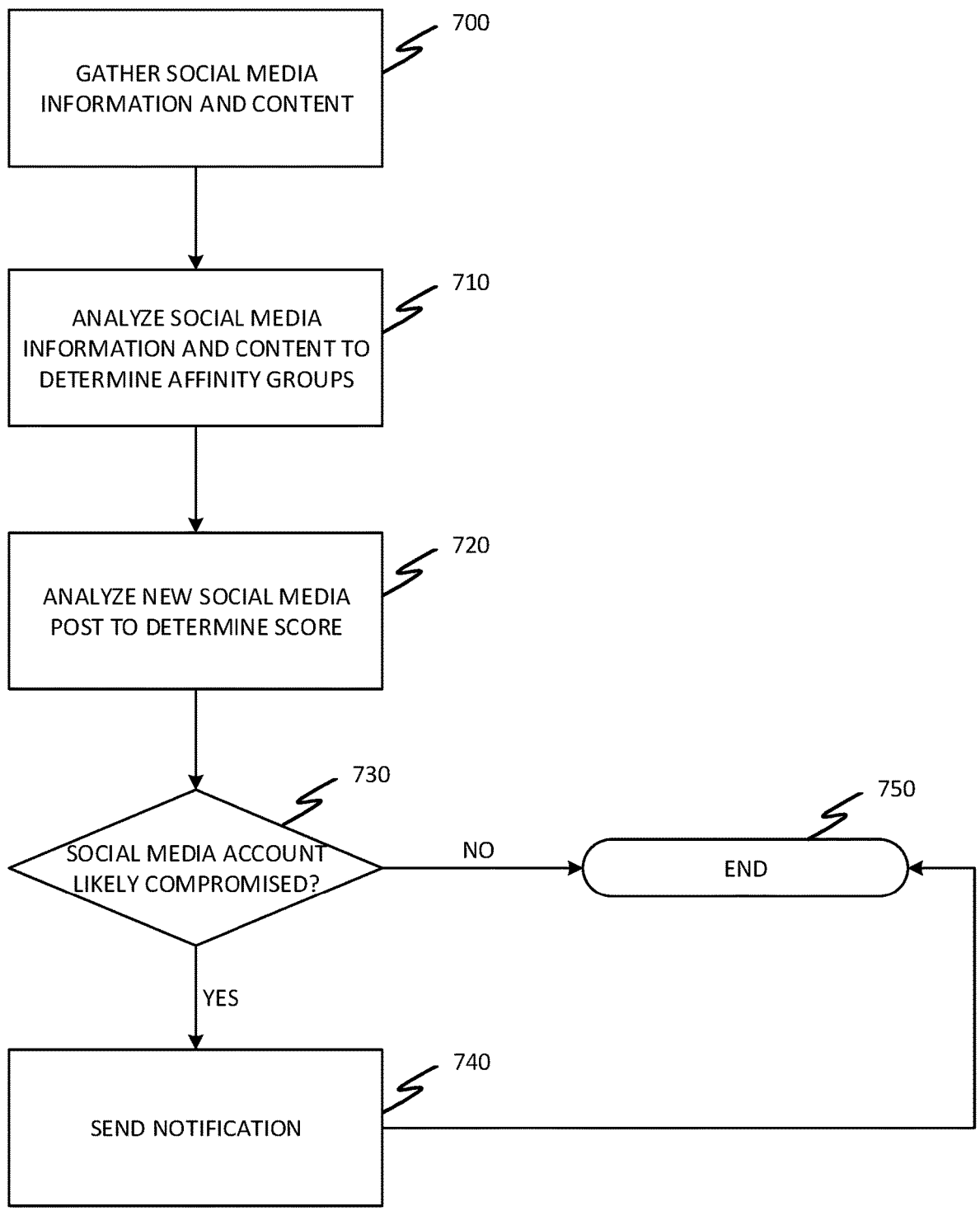
FIG. 7 depicts exemplary methods in accordance with aspects of the invention.

FIG. 7 depicts exemplary methods in accordance with aspects of the invention. The steps of the method may be performed in the computer system of FIG. 1, the cloud computing environment of FIG. 2, the environment of FIG. 4, and the program module of FIG. 5 and are described with reference to the elements and steps described with respect to FIGS. 1, 2, 4, and 5.

At step 700, the system gathers social media information and content. In embodiments, as described with respect to FIG. 5, step 700 may be performed by the social media information and content gatherer 500 of the compromised account detection program module 420 running on the server 410.

At step 710, the system analyzes the social media information and content gathered at step 700 to determine affinity groups. In embodiments, as described with respect to FIG. 5, step 710 may be performed by the affinity group identifier 510 of the compromised account detection program module 420 running on the server 410.

At step 720, the system analyzes a new social media post to determine a score, using the affinity groups determined at step 710 and the social media information and content gathered at step 700. In embodiments, as described with respect to FIG. 5, step 720 may be performed by the new social media post analyzer 520 of the compromised account detection program module 420 running on the server 410.

At step 730, the system determines whether or not a social media account that posted the new social media post analyzed at step 720 is likely to be compromised. In embodiments, as described with respect to FIG. 5, step 730 may be performed by the compromised account detector 530 of the compromised account detection program module 420 running on the server 410. If it is determined in step 730 that the social media account is not likely to be compromised, the flow proceeds to step 750, and processing ends. On the other hand, if it is determined in step 730 that the social media account is likely to be compromised, the flow proceeds to step 740.

At step 740, the system sends a notification to an account owner of the social media account, a social media network operator, or to the social media network or platform associated with the account, indicating that the account is likely to be compromised. In embodiments, as described with respect to FIG. 5, step 740 may be performed by the compromised account detector 530 of the compromised account detection program module 420 running on the server 410. The flow then proceeds to step 750, and processing ends.

According to another embodiment, the system may detect newly created social media accounts that were created to distribute malicious content. The system may use the limited information available regarding the newly created social media accounts to score the accounts against affinity groups, including information such as geolocation information (e.g., IP addresses or user-specified information), account creation date and time, numbers of friends and followers, and types of information shared (e.g., a level of similarity with respect to information shared by other accounts). Additionally, the system may determine that newly created accounts are members of a new account affinity group (e.g., accounts that are less than 10 days old). Since most newly created accounts have made few posts, a first post including a link to a website without any additional context may be determined to be likely connected to a compromised account. Weight factors may be determined using information such as a time since a social media account was created. Thresholds for determining that a social media account is likely compromised may be lower for newly created social media accounts. These thresholds may be adjusted upwards as the age of the social media account increases.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting a compromised social media account, the method comprising:
   receiving, by a computing device, social media content corresponding to a plurality of social media accounts;
   determining, by the computing device, a plurality of affinity groups, each including two or more social media accounts from the plurality of social media accounts, based upon the received social media content;
   comparing, by the computing device, content of a new post made by a particular social media account of the plurality of social media accounts with content in posts made by other social media accounts that are members of one or more same affinity groups as the particular social media account;
   determining, by the computing device, a likelihood of the new post having been made by an owner of the particular social media account based on the comparing;
   determining, by the computing device, to send a notification indicating that the particular social media account is compromised based on the likelihood of the new post having been made by the owner of the particular social media account; and
   sending, by the computing device, the notification indicating that the particular social media account is compromised.

2. The method according to claim 1, wherein the determining the plurality of affinity groups comprises:
   determining data associated with each of a plurality of dimensions from the received social media content; and
   for each of the plurality of dimensions, for each of the plurality of social media accounts, scoring the social media account using the determined data associated with the dimension for the social media account.

3. The method according to claim 2, wherein the determining the plurality of affinity groups further comprises:
   for each of the plurality of social media accounts, determining a point in n-dimensional space occupied by the social media account; and
   determining the plurality of affinity groups based on distances between the plurality of social media accounts in the n-dimensional space.

4. The method according to claim 3, wherein social media accounts within a predetermined threshold distance of a centroid of one of the plurality of affinity groups are determined to be members of the affinity group.

5. The method according to claim 1, wherein the determining likelihood of the new post having been made by the owner of the particular social media account comprises determining a score for the new post that represents the likelihood of the new post having been made by the owner of the particular social media account based on the comparing.

6. The method according to claim 5, further comprising:
   determining, by the computing device, a plurality of content entities in the new post, including a link, a picture, and text;
   for each of plurality of content entities, determining, by the computing device, a sub-score based on a correlation between the content entity and content entities in the posts made by the other social media accounts that are members of one or more same affinity groups as the particular social media account; and
   determining, by the computing device, the score for the new post based on the sub-scores.

7. The method according to claim 1, wherein the notification indicating that the particular social media account is compromised is a push notification to a mobile device.

8. The method according to claim 1, further comprising determining, by the computing device, that the particular social media account is compromised based on the likelihood of the new post having been made by the owner of the particular social media account, wherein in response to determining that the particular social media account is compromised, the computing device is further configured to block use of the particular social media account.

9. A computer program product comprising a computer readable storage medium having program instructions embodied therewith, the program instructions executable by a computing device to cause the computing device to:
   receive social media content corresponding to a plurality of social media accounts across a plurality of social media networks;
   determine a plurality of affinity groups based upon the received social media content;
   compare content of a new post made by a particular social media account of the plurality of social media accounts with content in posts made by other social media accounts that are members of one or more same affinity groups as the particular social media account;
   determine a likelihood of the new post having been made by an owner of the particular social media account based on the comparing; and
   determine to send a notification indicating that the particular social media account is compromised based on the likelihood of the new post having been made by the owner of the particular social media account; and
   send the notification indicating that the particular social media account is compromised.

10. The computer program product of claim 9, wherein the determining the likelihood of the new post having been made by the owner of the particular social media account comprises determining a score for the new post that represents the likelihood of the new post having been made by the owner of the particular social media account based on the comparing, the program instructions further executable by the computing device to cause the computing device to:
   determine a plurality of content entities in the new post, including a link, a picture, and text;
   for each of plurality of content entities, determine a sub-score based on a correlation between the content entity and content entities in the posts made by the other social media accounts that are members of one or more same affinity groups as the particular social media account; and
   determine the score for the new post based on the sub-scores.

11. The computer program product according to claim 9, wherein the determining the plurality of affinity groups comprises:
  determining data associated with each of a plurality of dimensions from the received social media content; and
  for each of the plurality of dimensions, for each of the plurality of social media accounts, scoring the social media account using the determined data associated with the dimension for the social media account.

12. The computer program product according to claim 11, wherein the determining the plurality of affinity groups further comprises:
  for each of the plurality of social media accounts, determining a point in n-dimensional space occupied by the social media account; and
  determining the plurality of affinity groups based on distances between the plurality of social media accounts in the n-dimensional space.

13. The computer program product according to claim 12, wherein social media accounts within a predetermined threshold distance of a centroid of one of the plurality of affinity groups are determined to be members of the affinity group.

14. The computer program product according to claim 9, wherein the notification indicating that the particular social media account is compromised is a push notification to a mobile device.

15. The computer program product according to claim 9, the program instructions further causing the computing device to: determine that the particular social media account is compromised based on the likelihood of the new post having been made by the owner of the particular social media account, and in response to determining that the particular social media account is compromised, block use of the particular social media account.

16. A system comprising:
  a hardware processor, a computer readable memory, and a computer readable storage medium associated with a computer device;
  program instructions of a social media content receiver configured to receive social media content corresponding to a plurality of social media accounts across a plurality of social media networks;
  program instructions of an affinity group determiner configured to determine a plurality of affinity groups, each including two or more social media accounts from the plurality of social media accounts, based upon the received social media content;
  program instructions of a compromised account determiner configured to compare content of a new post made by a particular social media account of the plurality of social media accounts with content in posts made by other social media accounts that are members of one or more same affinity groups as the particular social media account;
  program instructions to determine a likelihood of the new post having been made by an owner of the particular social media account based on the comparing;
  program instructions to determine whether the particular social media account is compromised based on the likelihood of the new post having been made by the owner of the particular social media account; and
  program instructions for the compromised account determiner to send a notification indicating that the particular social media account is compromised in response to determining that the particular social media account is compromised.

17. The system according to claim 16, wherein the affinity group determiner is further configured to:
  determine data associated with each of a plurality of dimensions from the received social media content; and
  for each of the plurality of dimensions, for each of the plurality of social media accounts, score the social media account using the determined data associated with the dimension for the social media account.

18. The system according to claim 17, wherein the affinity group determiner is further configured to:
  for each of the plurality of social media accounts, determine a point in n-dimensional space occupied by the social media account based upon the score for the social media account for each of the plurality of dimensions; and
  determine the plurality of affinity groups based on distances between the plurality of social media accounts in the n-dimensional space.

19. The system according to claim 16, wherein the notification indicating that the particular social media account is compromised is a push notification to a mobile device.

20. The system according to claim 16, wherein the compromised account determiner is further configured to:
  in response to determining that the particular social media account is compromised, block use of the particular social media account.

* * * * *